United States Patent Office 3,155,455
Patented Nov. 3, 1964

3,155,455
REMOVAL OF VANADIUM FROM AQUEOUS SOLUTIONS
James L. Hart, Bartlesville, Okla., assignor to Phillips Petroleum Company, a corporation of Delaware
No Drawing. Filed Dec. 12, 1960, Ser. No. 75,111
8 Claims. (Cl. 23—14.5)

This invention relates to the removal of vanadium from aqueous solutions. In one aspect, it relates to the removal of soluble uranium values from aqueous basic solutions, such as the pregnant uranium-containing liquor obtained by the carbonate leaching of uranium ore, or the leach solution obtained by leaching roasted yellow cake comprising sodium diuranate. In another aspect, it relates to an improved process for obtaining a relatively pure yellow cake product having a low vanadium content. In a further aspect, it relates to the preparation of a novel substrate or contact material for removing vanadium values from aqueous solutions.

An important and widely used hydrometallurgical process for recovering uranium from uranium-bearing materials is the "carbonate leaching process." This leaching process has been applied to both primary and secondary uranium mineral deposits, such as pitchblende, coffinite, carnotite, uraninite, tyuyamunite, etc., but it is especailly useful in leaching ore of high carbonate content. It is this leaching process that is the concern of the subject invention.

The carbonate leaching process for extracting uranium values from the uranium-bearing materials comprises contacting crushed uranium-bearing ore with hot recycle aqueous alkaline sodium carbonate-sodium bicarbonate solution and, where uranium is present in the quadrivalent state, an oxidizing agent, such as potassium permanganate or air, to form a slurry of leached pulp and pregnant leach liquor containing the stable soluble uranyl tricarbonate complex anion. The pregnant leach solution is separated from the leached pulp, for example by means of a plurality of vacuum drum filters operated in series, and after the pregnant leach solution is clarified, for example by filtering it through a precoated drum filter, the soluble uranium values are precipitated from the pregnant liquor by the addition of an excess of caustic, such as sodium hydroxide. This addition of sodium hydroxide neutralizes the bicarbonate present and then causes the soluble uranium values to precipitate as sodium diuranate (this precipitate commonly called "yellow cake"). The solution containing the precipitated yellow cake is then thickened and separated, for example by filtering the thickened solution in a rotary filter. The yellow cake is then dried and packaged. The hydroxide-carbonate solution recovered as overflow during the thickening of the caustic-treated pregnant solution is commonly referred to as "barren liquor" and it is recarbonated by passing carbon dioxide through it, using for example a supply of waste carbon dioxide such as flue gas. Recarbonated barren liquor is then commonly employed as a carbonate-bicarbonate wash liquid in the filtration of the slurry of leached pulp and pregnant leach solution. The recarbonated barren liquor is then recycled to the leaching operation for reuse.

Other metals and nonmetals are commonly associated with uranium-bearing material. The principal metal commonly associated with uranium-bearing materials is vanadium, although other metals such as zirconium, iron, titanium, barium, aluminum, silicon, antimony, and cobalt, and nonmetallic elements such as phosphorus are commonly associated with uranium-bearing materials. These other metals and nonmetals, especially vanadium, are commonly extracted with the uranium values in the carbonate leaching step and gradually build up in concentration in the process. For example, a typical secondary uranium ore such as coffinite will contain about 0.25 percent $U_3O_8$ and 0.1 percent $V_2O_5$, and during the leaching step about 10 to 20 percent of the vanadium present in the ore will also be leached. During the subsequent precipitation of the pregnant leach solution with caustic, some of the vanadium values present in the pregnant liquor will also be precipitated together with the uranium values, for example 40 to 60 percent of the $V_2O_5$ present in the pregnant liquor will precipitate with the yellow cake. In fact, up to 85 percent of the vanadium extracted from the ore may appear in the yellow cake produced. The other metals and nonmetals, present as impurities in the pregnant liquor, will also tend to be precipitated with the yellow cake or become occluded therein. Thus, an impure yellow cake product is often obtained, and, for example, the vanadium content of the yellow cake will often be considerable, e.g., 2 to 7 weight percent.

The presence of these other metals and nonmetals in the yellow cake, especially the presence of vanadium, is undesirable because it renders the subsequent conversion of the yellow cake into uranium metal, or into other uranium compounds such as the hexachloride, much more difficult. The Atomic Energy Commission, a major purchaser of yellow cake produced in this country, penalizes producers of yellow cake if the purity of the yellow cake is not as high as desirable, and it will even refuse to purchase such impure yellow cake. In the case of the vanadium impurity, the Atomic Energy Commission may exact a price penalty if the vanadium content, expressed as $V_2O_5$, exceeds for example two weight percent of the $U_3O_8$ in the yellow cake, or the AEC may refuse to buy the yellow cake if the vanadium contaminant content is excessive. In many cases, the vanadium content of the yellow cake may be as high as 6 or 7 percent of the $U_3O_8$ content.

One method which has been proposed and used heretofore for purifying the yellow cake is that which involves heating or roasting the same with a high melting sodium salt, such as, sodium carbonate (M.P. 851° C.) or sodium chloride (M.P. 800.4° C.), sometimes together with sawdust, after which the roasted yellow cake is leached with water to dissolve the solubilized vanadium. The resulting slurry of insoluble, purified yellow cake and leach solution containing soluble vanadium values is then filtered to recover the purified yellow cake. The vanadium values present in the leach solution filtrate can then be recovered by acidifying the leach solution to precipitate the vanadium values as sodium hexametavanadate. While this roasting method, using the high melting sodium salt, has enjoyed some success, this method generally requires relatively high roasting temperatures on the order of 850° C. or higher, thus necessitating relatively high fuel costs and requiring frequent repairs of the roasting furnace. Another disadvantage of this roasting method resides in the fact that some of the uranium values are also solubilized, such solubilization consequently resulting in the loss of a small but valuable amount of the uranium values. For these reasons, and others, this roasting method, using relatively high roasting temperatures and high melting sodium salts, has not solved the need for an improved method of producing a purer yellow cake, or recovering vanadium values.

Accordingly, an object of this invention is to remove soluble vanadium values from aqueous solutions. Another object is to provide an improved method of removing soluble vanadium values from the pregnant uranium-containing liquor obtained by the carbonate leach of uranium ore. Another object is to provide an improved method of removing soluble vanadium values from the pregnant vanadium-containing liquor obtained by leaching roasted yellow cake. Another object is to provide an improved method for obtaining a relatively pure yellow cake product having a low vanadium content. Another object is to improve the recovery of uranium from uranium-bearing ores. Another object is to provide a novel substrate or contact material for removing soluble vanadium values from an aqueous solution. Other objects and advantages of this invention will become apparent to those skilled in the art from the following discussion and appended claims.

Briefly stated, in one of its broader aspects this invention provides a method whereby an aqueous solution containing soluble vanadium values, such as the pregnant liquor of the carbonate leaching process, is contacted with lead sulfate, lead carbonate, or lead phosphate deposited, impregnated, or otherwise contained in a permeable bed of an inert substrate or contact material comprising a polymer of a polymerizable heterocyclic nitrogen base, having a

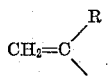

group or substituent attached to a nuclear carbon atom, where R is a methyl group or hydrogen. By contacting the aqueous solution containing soluble vanadium values with the polymer substrate or bed containing insoluble lead sulfate, lead carbonate, or lead phosphate, such lead salt is converted to insoluble lead vanadate, which remains in or adheres to the "loaded" polymer substrate. When the substrate becomes sufficiently loaded with lead vanadate, the vanadium values are removed from the loaded substrate, for example, by contacting or eluting the same with an acid which will convert the vanadate anion to vanadic acid, such as aqueous sulfuric acid, aqueous sulfurous acid or aqueous phosphoric acid. The soluble vanadium values can then be recovered from the pregnant elutant, for example, by further acidifying the pregnant liquor to precipitate the soluble vanadium values as metavanadic acid, which acid can be melted and dehydrated to vanadium pentoxide.

Following the removal of the vanadium values from the loaded substrate, the latter can be regenerated and washed, if necessary. If sulfuric acid is employed to elute the vanadium values, this elution step may also serve as a regeneration step, while if sulfurous acid is used for purposes of elution, the elution step must be followed by treating the substrate with sulfuric acid or phosphoric acid. The concentration of the regeneration acid can vary and generally will be within the range of 1 and 15 N, while the total amount of regeneration acid employed should be in excess of that required for stoichiometric reaction with lead vanadate, generally from 5 to 50 times the amount required for reaction.

After regenerating the substrate by treating the same with sulfuric or phosphoric acid, it is desirable to wash the regenerated substrate, for example with water in the amount of 0.5 and 10 times per volume of acid employed for regeneration. It is also within the scope of this invention to employ a small amount of hydrogen peroxide in the wash water, e.g., 0.5 to 2 weight percent based on the water, the hydrogen peroxide aiding in obtaining a more complete regeneration.

The polymer substrate or contact material per se used in this invention is inert with respect to the solution it comes into contact with and is in particulate or granulated form. The heterocyclic nitrogen bases which can be used in preparing the polymers used in this invention representatively include those of the pyridine series (e.g., 4 - vinyl - 1 - 2 - dihydropyridine, 4 - vinyltetrahydropyridine, 2-vinylpyridine, 4-vinylpyridine, 2-vinyl-5 - ethylpyridine, 5 - methyl - 2 - vinylpyridine, 5 - ethyl-2 - vinylpyridine, 2 - methyl - 5 - vinylpyridine, 3 - ethyl-5 - vinylpyridine, 4 - methyl - 3 - vinylpyridine, 2 - isopropenylpyridine, 5 - propyl - 2 - isopropenylpyridine, 3 - dodecyl - 4,5 - divinylpyridine, 2 - decyl - 5 - isopropenylpyridine, 2 - octyl - 5 - vinylpyridine, 2,4,6-trimethyl - 5 - vinylpyridine, 3,4,5,6 - tetramethyl - 2-vinylpyridine, 3,5 - diisopropenylpyridine, 2,6 - diethyl-4 - vinylpyridine, 2,4 - dimethyl - 5,6 - dipentyl - 3-vinylpyridine, 2 - isopropyl - 4 - nonyl - 5 - vinylpyridine, 2 - methyl - 5 - undecyl - 6 - vinylpyridine, 2,5-divinylpyridine, 3-methyl-2,5-divinylpyridine, etc.), those of the quinoline series (e.g., 2-vinylquinoline, 2-methyl-5 - vinylquinoline, 2,8 - dimethyl - 3 - vinylquinoline, 2,3,8 - trimethyl - 5 - vinylquinoline, 2 - vinyltetrahydroquinoline, 8 - ethyl - 2 - vinylquinoline, 4 - hexyl - 5-vinylquinoline, 2,5-divinylquinoline, etc.), those of the isoquinoline series (e.g., 1-vinylisoquinoline, 5-methyl-1-isopropenylisoquinoline, 1,8 - divinylisoquinoline, 3,5-divinylisoquinoline, 6,7 - dimethyl - 3,5 - divinylisoquinoline, etc.), and the like.

Copolymers of the

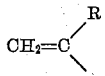

substituted heterocyclic nitrogen bases with copolymerizable polyvinyl benzenes are also useful in the practice of this invention. Representative polyvinyl benzene comonomers which can be used in the practice of this invention representatively include divinyl benzene, trivinyl benzene, tetravinyl benzene, and the ring-substituted derivatives thereof in which the substituting group may be an alkyl such as methyl, ethyl, propyl, isopropyl, butyl, isobutyl, octyl, etc., or an aryl group such as phenyl, or combinations of the same, such as aralkyl and alkaryl.

The ratio of polyvinyl benzene comonomer to the substituted heterocyclic nitrogen base monomer can vary and generally will be from 1 to 20 parts, by weight, preferably less than 5 parts, of the polyvinyl benzene to 100 parts by weight of the heterocyclic nitrogen base.

These polymers can be prepared by well-known procedures, such as by mass, solution, suspension or emulsion polymerization. The polymerization reaction can be catalyzed by such materials as heat, light, oxygen, peroxides such as benzoyl peroxide, lauroyl peroxide, di(tertiary alkyl) peroxides, tertiary alkyl hydroperoxides, persalts, such as potassium persulfate, ammonium persulfate, perborates, and the like. Further details on the preparation of these highly cross-linked polymers will be omitted in the interest of brevity since such procedures are well known in the art.

As mentioned above, the polymer substrate of this invention is impregnated with or contains water-insoluble lead sulfate, or lead carbonate or lead phosphate. The polymer substrate can be impregnated with these insoluble lead salts by treating the polymer substrate with an aqueous solution of a water-soluble lead salt, such as lead acetate, lead citrate, lead nitrate, and the like, lead salts which are soluble in cold water, e.g., at least to the extent of 10 grams per 100 ml. at 20° C. The concentration of the aqueous solution of water-soluble lead salt will vary and generally be within the range of 0.25 and 1.0 molar. These aqueous solutions can be mixed with the particulate polymer in any convenient manner, after which treatment the mixture is treated with aqueous sulfuric acid, aqueous sodium carbonate, or aqueous phosphoric acid so as to deposit insoluble lead sulfate, lead carbonate, or lead phosphate on the polymer substrate. The amount of water-soluble lead salt solution employed will be sufficient to deposit from 2 to 100 grams of lead sulfate, lead carbonate, or phosphate per gram of polymer substrate after conversion of the water-soluble lead salt with the sulfuric acid, phosphoric acid, or sodium carbonate solution. The concentration of the aqueous solution used to convert the water-soluble lead compound into insoluble lead compound generally will be in the range of 1 to 15 N, preferably 1 to 10 N, and the volume of this solution employed will be sufficient to provide an excess of sulfate, phosphate, or carbonate anions over and above that required for complete conversion of the water-soluble lead salt to insoluble lead compound.

Following the conversion of the soluble lead compound to the insoluble lead compound the excess sulfuric or phosphoric acid, or carbonate can be washed from the substrate with water, e.g., 1 to 10 volumes of water per volume of acid or carbonate solution.

The polymer substrate containing the water-insoluble lead salt can be employed to remove the vanadium values from any aqueous solution, such as the pregnant liquor of the carbonate leaching process, barren carbonate leaching liquor from this process, and the leach liquor from the leaching of roasted yellow cake. The vanadium valves present in these aqueous solutions can be removed by either batch-wise operations or semi-continuous operations using two or more beds of the permeable substrate containing the lead compound. The bed of polymer substrate can vary in desity, but it should be understood that it is sufficiently permeable to allow the aqueous, vanadium-containing solution and other solutions to pass or percolate through the substrate.

Where the aqueous vanadium-containing solutions contain soluble uranium values, such as in the case of the pregnant liquor obtained by the carbonate leaching of uranium ore, the novel substrate of this invention selectively and preferentially removes the vanadium values without removing the uranium values.

Depending upon which insoluble lead salt is used, from 4.4 to 5 grams of the insoluble lead sulfate, lead phosphate, or lead carbonate is required for reaction with 1 gram of $V_2O_5$; thus the amount of aqueous, vanadium-containing solution which can be treated with the novel substrate of this invention will depend upon the particular insoluble lead salt used, the amount of the insoluble lead salt present in the substrate, the concentration of the $V_2O_5$ in the aqueous solution, and the total amount of substrate.

Generally, the aqueous solutions to be treated according to this invention will contain from about 0.2 to 60 grams of $V_2O_5$ per liter. Ordinarily, the pregnant uranium-containing liquor obtained from the carbonate leaching process will contain from 0.2 to 20 grams of $V_2O_5$ per liter, and the leach solution obtained by the roasted yellow cake will contain from 0.2 to 40 grams of $V_2O_5$ per liter. Based on these concentrations, a gram of polymer substrate containing from 2 to 100 grams of lead sulfate or phosphate will be contacted with from about 0.2 to 1 liter of aqueous vanadium-containing solution for theoretical loading, or 0.1 to 0.8 liter for 80 percent loading.

The following examples further illustrate the objects and advantages of this invention, but it should be understood that these examples and the various amounts, materials, and other conditions recited in these examples should not be construed to unduly limit this invention.

EXAMPLE I

A highly crosslinked polymer of 2-methyl-5-vinylpyridine was prepared by heating a mixture containing 0.4 weight percent divinylbenzene, 5.0 weight percent water, and 94.6 weight percent 2-methyl-5-vinylpyridine at 85° C. for 18 hours. The resulting highly crosslinked polymer, amounting to 9.25 g., was washed with acetone and soaked in 150 ml. of aqueous $Pb(NO_3)_2$ containing 300 g./l. of the lead salt. A vacuum was applied to the container to achieve a more thorough saturation of the polymer, after which the excess lead nitrate solution was decanted off. The wet polymer was then added to 200 ml. of 9 N aqueous sulfuric acid, after which the decanted polymer was washed seven times with 200 ml. of water being used in each wash. The lead sulfate-containing polymer substrate was recovered and amounted to 97 g.

A 5/8" I.D. column was then packed to a height of 8" with 35.5 g. of the above-prepared lead sulfate-containing polymer substrate. This column was then used to treat five 100 ml. batches of pregnant carbonate leach solution containing dissolved uranium and vanadium values, one 75 ml. batch of leach liquor from a yellow cake roast containing 6.75 g./l. of $V_2O_5$, and 3 more 150 ml. of 3 N aqueous $H_2SO_4$ through the column. The pregnant carbonate leach solution contained 0.36 g./l. $V_2O_5$. The results of these tests are expressed below as Table I.

Table I

| Run number | 1 | 2 | 3 | 4 | 5 | 6 | 7 | 8 | 9 |
|---|---|---|---|---|---|---|---|---|---|
| Solution used | Preg. | Preg. | Preg. | Preg. | Preg. | Leach | Preg. | Preg. | Preg. |
| Minutes to pass thru column | 8 | 18 | 4 | 27 | 45 | 10½ | 11 | 11 | 11 |
| Effluent, g./l. $V_2O_5$ | 0.030 | 0.017 | 0.020 | 0.012 | 0.005 | 0.060 | *2.06 | 0.302 | 0.225 |
| Cumulative total of $V_2O_5$ removed, g. | 0.033 | 0.067 | 0.101 | 0.136 | 0.172 | *0.670 | 0.500 | 0.507 | 0.520 |

*The high loading in Run 6 was due to physical adherence of liquor of high $V_2O_5$ content. This is shown by the high $V_2O_5$ content of the effluent in Run 7.

After Run 9 was completed, the vanadium was eluted and the lead-containing substrate regenerated by passing 150 ml. of 3 N aqueous $H_2SO_4$ through the column. The column was then washed with 100 ml. of water. The eluted vanadium amounted to 0.459 g. of $V_2O_5$.

EXAMPLE II

The regenerated and washed column used in Example I was used to remove vanadium from additional 100 ml. samples of carbonate leach liquor which contained 0.36 g./l. $V_2O_5$. The results of these runs are expressed below as Table II.

Table II

| Run No. | Time for 100 ml. of carbonate leach liquor to pass through column, min. | $V_2O_5$ in effluent, g./l. | Cumulative total of $V_2O_5$ remaining in column, g. |
|---|---|---|---|
| 10 | | 0.075 | 0.029 |
| 11 | 4 | 0.017 | 0.063 |
| 12 | 4 | 0.015 | 0.097 |
| 13 | 4 | 0.050 | 0.128 |
| 14 | 4 | 0.090 | 0.155 |
| 15 | 4 | 0.135 | 0.178 |
| 16 | 4 | 0.153 | 0.199 |
| 17 | 4 | 0.167 | 0.218 |
| 18 | 43 | 0.037 | 0.250 |
| 19 | 9 | 0.095 | 0.277 |
| 20 | 4.5 | 0.090 | 0.304 |
| 21 | 49 | 0.055 | 0.334 |
| 22 | 15 | 0.227 | 0.347 |
| 23 | 21 | 0.150 | 0.368 |

The column was then eluted with the 150 ml. of 3 N aqueous $H_2SO_4$ which had been used in the previous elution in Example I followed by an additional 50 ml. of 6 N aqueous $H_2SO_4$. The wash water from the previous washing in Example I was then employed for washing, followed by a wash with 200 ml. of new wash water containing 2 ml. of 30 wt. percent aqueous $H_2O_2$. The total amount of $V_2O_5$ eluted was 0.24 g.

EXAMPLE III

The regenerated and washed column of Example II was used again for removing vanadium from leach liquor from the water leaching of roasted yellow cake. This leach liquor contained 6.70 g./l. $V_2O_5$, and six 50 ml. batches of this leach liquor were passed successively through the column. The results of these runs are expressed below in Table III.

*Table III*

| Run | Time for 50 ml. of leach liquor to pass through column, min. | $V_2O_5$ in effluent, g./l. |
|---|---|---|
| 24 | | 0.15 |
| 25 | | 3.45 |
| 26 | 6 | 3.19 |
| 27 | 8 | |
| 28 | 18.5 | |
| 29 | 19 | 4.21 |

The column was then washed with water, and $SO_2$ was bubbled in the bottom. After the sulfur dioxide water (sulfurous acid) was drained, the column was treated with 60 ml. of 1 N aqueous sulfuric acid. The column was washed with 200 ml. of water. The $V_2O_5$ eluted amounted to 0.74 g.

The regenerated and washed column was again used to treat additional roasted yellow cake leach liquor containing 6.70 g./l. $V_2O_5$, three 100 ml. batches of this liquor being passed successively through the column. Results are given in Table IV.

*Table IV*

| Run | Time for 100 ml. of leach liquor to pass through column, min. | $V_2O_5$ in effluent, g./l. | Cumulative total of $V_2O_5$ removed, g. |
|---|---|---|---|
| 30 | 7 | 1.50 | 0.588 |
| 31 | 9.5 | 6.85 | 0.641 |
| 32 | 15.5 | 3.15 | 1.064 |

The column was then eluted with the sulfurous acid from the preceding elution, followed by regeneration with the 1 N sulfuric acid from preceding runs, followed by an additional 50 ml. of 6 N aqueous $H_2SO_4$. The column was then washed with the wash water from the preceding wash, followed by 100 ml. of fresh wash water. The total $V_2O_5$ eluted was 1.07 g.

The overall loading of $V_2O_5$ in the first 32 runs (Examples I, II, III) was 2.66 g., and the amount eluted was 2.51 g.

EXAMPLE IV

Another batch of highly crosslinked 2-methyl-5-vinylpyridine polymer was prepared by exactly the same procedure employed in Example I.

After washing this polymer with acetone, 10 grams of the polymer was added to 200 ml. of aqueous lead nitrate solution containing 300 g./l. $Pb(NO_3)_2$. A vacuum was applied to the mixture and maintained for 30 min., after which the liquid was decanted off. The impregnated polymer substrate was then dried at 110° C., for 18 hrs., after which the 40.3 g. of dried product was added to 300 ml. of 9 N aqueous sulfuric acid. A vacuum was then applied to the mixture and held for one hour, after which the lead sulfate-containing substrate was washed 4 times with water, using 200 ml. of water each time.

Thirty g. of the wet impregnated substrate was then mixed with carbonate leach solution (zero uranium and vanadium content), and packed into a 5/8" I.D. column to give 7.5" of bed. A roasted yellow cake leach liquor containing 6.70 g./l. $V_2O_5$ was then passed through the bed in successive batches. Results are given in Table V.

*Table V*

| Amt. of leach liquor, ml. | Time for leach liquor to pass through column, min. | $V_2O_5$ in effluent, g./l. | Cumulative total of $V_2O_5$ removed, g. |
|---|---|---|---|
| 50 | 6 | 0.83 | 0.294 |
| 50 | 5.5 | 1.13 | 0.572 |
| 50 | 9 | 2.75 | 0.770 |
| 50 | 10.75 | 4.30 | 0.890 |
| 50 | 26 | 4.75 | 0.987 |
| 100 | 15 | 4.20 | 1.237 |
| 100 | 15.25 | 6.65 | 1.242 |
| 100 | 15 | 6.65 | 1.247 |
| 100 | 65 | 6.65 | 1.252 |

After washing the column with water, the vanadium was eluted as follows:

*Table VI*

| Amt. of elutant, ml. | Elutant | $V_2O_5$ in effluent, g./l. | Cumulative total of $V_2O_5$ removed, g. |
|---|---|---|---|
| 40 | 12 N $H_2SO_4$ | 11.94 | 0.48 |
| 51 | 3 N $H_2SO_4$ | 2.53 | 0.61 |
| 55 | $H_2O$ | 1.57 | 0.70 |
| 221 | $H_2O$ | 0.46 | 0.80 |

EXAMPLE V

Another batch of the impregnated polymer substrate was prepared in exactly the same manner of Example IV except that the polymer was not washed with acetone prior to impregnation. Thirty-six grams of impregnated substrate was treated with carbonate leach liquor and then packed into a 5/8" I.D. column to give 8" of bed. Batches of roasted yellow cake leach liquor containing 6.70 g./l. $V_2O_5$ was then passed through the bed. Results are given in Table VII.

*Table VII*

| Amt. of leach liquor, ml. | Time for leach liquor to pass through column, min. | $V_2O_5$ in effluent, g./l. | Cumulative total of $V_2O_5$ removed, g. |
|---|---|---|---|
| 50 | 7 | 0.45 | 0.313 |
| 50 | 5.5 | 1.08 | 0.594 |
| 50 | 11 | 1.82 | 0.838 |
| 50 | 11 | 2.95 | 1.025 |
| 50 | 41 | 2.90 | 1.215 |
| 100 | 17 | 3.65 | 1.520 |
| 100 | 13 | 6.70 | 1.520 |
| 100 | 13 | 6.75 | 1.520 |
| 100 | 60 | 6.70 | 1.520 |

After washing the column with water, the vanadium was eluted as follows:

*Table VIII*

| Amt. of elutant | Elutant | $V_2O_5$ in effluent, g./l. | Cumulative total of $V_2O_5$ removed, g. |
|---|---|---|---|
| 32 | 12 N $H_2SO_4$ from Ex. IV | 20.40 | 0.636 |
| 50 | 3 N $H_2SO_4$ from Ex. IV | 10.95 | 1.057 |
| 228 | Wash water from Ex. IV | 3.21 | 1.618 |
| 198 | do | 0.23 | 1.663 |

EXAMPLE VI

The column of Example V regenerated and washed as shown in Table VIII was used to remove tetravalent vanadium from basic solutions. In these runs, 6.5 g. of vanadyl sulfate ($VOSO_4$) was dissolved in 500 ml. of carbonate leach solution and filtered. Fifty ml. batches of the resulting solution, containing 6.80 g./l. $V_2O_5$ of tetravalent vanadium were successively passed through the column. Results are given in Table IX.

Table IX

| Time for leach solution to pass thru column, min. | V₂O₅ in effluent, g./l. | Cumulative total of V₂O₅ removed, g. |
| --- | --- | --- |
|  | 1.80 | 0.25 |
| 7 | 1.80 | 0.50 |
| 7.25 | 1.80 | 0.75 |
| 8 | 3.40 | 0.92 |
| 7 | 6.60 | 0.93 |
| 7.25 | 6.80 | 0.93 |
| 7 | 6.83 | 0.93 |

Various modifications and alterations of this invention will become apparent to those skilled in the art, without departing from the scope and spirit of this invention, and it should be understood that this invention is not to be unduly limited to the foregoing description.

I claim:

1. A method of removing soluble vanadium values from an aqueous solution containing the same, which comprises containing a permeable bed comprising an inert substrate of a

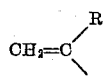

substituted heterocyclic nitrogen base polymer and a lead salt selected from the group consisting of lead sulfate, lead phosphate, and lead carbonate, where R is selected from the group consisting of hydrogen and a methyl group, and removing vanadium values from the resulting lead vanadate-loaded bed.

2. A method of removing soluble vanadium values from an aqueous basic solution containing the same, which comprises passing said solution through a liquid permeable bed comprising an inert substrate of a

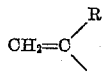

substituted heterocyclic nitrogen base polymer loaded with lead sulfate, where R is selected from the group consisting of hydrogen and a methyl group, and eluting vanadium values from the resulting lead vanadate-loaded substrate.

3. A method of removing soluble vanadium values from an aqueous basic solution containing the same, which comprises passing said solution through a liquid permeable bed comprising an inert substrate of a

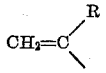

substituted heterocyclic nitrogen base polymer loaded with lead sulfate, where R is selected from the group consisting of hydrogen and a methyl group, said heterocyclic nitrogen base being selected from the group consisting of those of the pyridine series, the quinoline series, and the isoquinoline series, and eluting vanadium values from the resulting lead vanadate-loaded substrate by passing a solvent for said lead vanadate through said lead vanadate loaded substrate.

4. A method according to claim 3 wherein said solvent is selected from the group consisting of sulfuric acid and sulfurous acid.

5. A method according to claim 4 wherein said solvent is sulfurous acid, and said bed is regenerated after said vanadium values are removed by passing a regeneration liquid through said bed selected from the group consisting sulfuric acid and phosphoric acid.

6. A method of removing soluble vanadium values from the pregnant uranium-containing liquor of the carbonate leaching process, which comprises passing said liquor through a liquid permeable bed of particulate highly cross-linked polymer having deposited therein lead sulfate, said polymer providing an inert substrate for said lead sulfate and comprising a polymer of a vinyl-substituted heterocyclic nitrogen base selected from the group consisting of those of the pyridine series, the quinoline series, and the isoquinoline series, whereby said lead sulfate is converted to lead vanadate, and eluting the vanadium values from the resulting lead vanadate-loaded substrate by passing dilute sulfuric acid through said loaded substrate.

7. The method according to claim 6 wherein said heterocyclic nitrogen base is 2-methyl-5-vinylpyridine.

8. A method of removing soluble vanadium values from the aqueous leach liquor obtained by leaching roasted yellow cake comprising sodium diuranate, which comprises passing said liquor through a liquid permeable bed of particulate highly cross-linked polymer having deposited therein lead sulfate, said polymer providing an inert substrate for said lead sulfate and comprising a polymer of a vinyl-substituted heretocyclic nitrogen base selected from the group consisting of those of the pyridine series, the quinoline series, and the isoquinoline series, whereby said lead sulfate is converted to lead vanadate, and eluting the vanadium values from the resulting lead vanadate-loaded substrate by passing dilute sulfuric acid through said load substrated.

References Cited in the file of this patent

UNITED STATES PATENTS

| | | |
| --- | --- | --- |
| 1,129,029 | Vogt | Feb. 16, 1915 |
| 2,442,429 | Nye et al. | June 1, 1948 |
| 2,583,591 | Perrin et al. | Jan. 29, 1952 |
| 2,654,653 | Nye et al. | Oct. 6, 1953 |
| 2,683,124 | D'Alelio | July 6, 1954 |
| 2,714,076 | Seckel | July 26, 1955 |
| 2,735,790 | Waitkus | Feb. 21, 1956 |
| 2,970,132 | Reynolds et al. | Jan. 31, 1961 |

OTHER REFERENCES

RMO-2619, pages 1, 5, 6, 10-22, 31, 32, 42, June 1955.

UNITED STATES PATENT OFFICE
CERTIFICATE OF CORRECTION

Patent No. 3,155,455                                            November 3, 1964

James L. Hart

It is hereby certified that error appears in the above numbered patent requiring correction and that the said Letters Patent should read as corrected below.

Column 9, line 21, for "containing" read -- contacting --; column 10, line 4, for "vanadate loaded" read -- vanadate-loaded --; line 42, for "substrated" read -- substrate --.

Signed and sealed this 13th day of April 1965.

(SEAL)
Attest:

ERNEST W. SWIDER                                        EDWARD J. BRENNER
Attesting Officer                                            Commissioner of Patents